(12) United States Patent
Furusawa (10) Patent No.: US 11,298,788 B2
(45) Date of Patent: Apr. 12, 2022

(54) ELECTRIC POWER TOOL DUST COLLECTION SYSTEM

(71) Applicant: MAKITA CORPORATION, Anjo (JP)

(72) Inventor: Masanori Furusawa, Anjo (JP)

(73) Assignee: MAKITA CORPORATION, Anjo (JP)

( * ) Notice: Subject to any disclaimer, the term of this patent is extended or adjusted under 35 U.S.C. 154(b) by 198 days.

(21) Appl. No.: 16/416,994

(22) Filed: May 20, 2019

(65) Prior Publication Data

US 2019/0381618 A1 Dec. 19, 2019

(30) Foreign Application Priority Data

Jun. 19, 2018 (JP) ............................. JP2018-116349
Jun. 19, 2018 (JP) ............................. JP2018-116351

(51) Int. Cl.
*B23Q 11/00* (2006.01)
*B23B 47/34* (2006.01)
*B25D 17/02* (2006.01)

(52) U.S. Cl.
CPC .......... *B23Q 11/0046* (2013.01); *B23B 47/34* (2013.01); *B23B 2251/68* (2013.01); *B23B 2270/30* (2013.01); *B25D 17/02* (2013.01)

(58) Field of Classification Search
CPC . B23Q 11/0046; B23B 47/34; B23B 2251/68; B23B 2270/30; B23B 2270/62; B23B 45/003; B25D 17/02
See application file for complete search history.

(56) References Cited

U.S. PATENT DOCUMENTS

| 3,256,944 A | 6/1966 | Holzapfel |
| 8,186,453 B2 | 5/2012 | Furusawa et al. |
| 9,193,021 B2 | 11/2015 | Machida et al. |

(Continued)

FOREIGN PATENT DOCUMENTS

| EP | 2946860 A1 | 11/2015 |
| JP | 2007-061977 A | 3/2007 |

(Continued)

OTHER PUBLICATIONS

Nov. 30, 2021 Office Action issued in Japanese Patent Application No. 2018-116349.

(Continued)

*Primary Examiner* — Anna K Kinsaul
*Assistant Examiner* — Veronica Martin
(74) *Attorney, Agent, or Firm* — Oliff PLC (57) ABSTRACT

An electric power tool dust collection system includes: a hammer drill, to which a dust suction bit is mounted; a dust collection device mounted to the hammer drill and including a suction portion (introduction port), a dust collection motor, a dust collection fan rotated by drive of the dust collection motor to generate a sucking force in the introduction port, and a dust collection portion (dust box) that stores powder dust suctioned from the introduction port; and exhaust flow paths (exhaust flow path and tubular flow path) respectively formed in the hammer drill and the dust collection device to lead exhaust that has passed through the dust box to a high-temperature portion (output portion) of the hammer drill.

14 Claims, 5 Drawing Sheets

(56) References Cited

U.S. PATENT DOCUMENTS

| | | | |
|---|---|---|---|
| 2010/0155095 | A1 | 6/2010 | Furusawa et al. |
| 2013/0055527 | A1 | 3/2013 | Machida et al. |
| 2013/0337728 | A1* | 12/2013 | Walker ................... B24B 23/04 |
| | | | 451/453 |
| 2017/0173748 | A1* | 6/2017 | Ullrich ............... B23Q 11/0071 |
| 2018/0147681 | A1* | 5/2018 | Le ........................... B25F 5/003 |
| 2018/0311778 | A1* | 11/2018 | Meiser .................. B25D 17/20 |

FOREIGN PATENT DOCUMENTS

| | | |
|---|---|---|
| JP | 2010-162683 A | 7/2010 |
| JP | 2010-201526 A | 9/2010 |
| JP | 2013-56386 A | 3/2013 |
| JP | 2015-150665 A | 8/2015 |

OTHER PUBLICATIONS

Nov. 30, 2021 Office Action issued in Japanese Patent Application No. 2018-116351.

* cited by examiner

ELECTRIC POWER TOOL DUST COLLECTION SYSTEM

BACKGROUND

This application claims the benefit of Japanese Patent Application Number 2018-116349, 2018-116351 filed on Jun. 19, 2018, the entirety of which is incorporated by reference.

TECHNICAL FIELD

The present invention relates to an electric power tool dust collection system that is used to collect powder dust generated when an electric power tool such as a hammer drill is used.

RELATED ART

An electric power tool dust collection device such as that disclosed in Japanese Patent Application Publication No. 2015-150665 (JP 2015-150665 A) is used, in the case where a workpiece such as a concrete or stone material is processed using an electric power tool such as a hammer drill, such that powder dust generated from the workpiece is not scattered.

In the disclosed device, a dust collection motor, a fan, and a filter are provided in a body portion mounted to a hammer drill, a nozzle (suction portion) that projects forward from the body portion penetrates a bit, and powder dust is suctioned from the nozzle by a sucking force due to rotation of the fan to be collected in the body portion.

SUMMARY

In the electric power tool dust collection device according to the related art described above, an air flow generated by rotation of the fan is only discharged out of the body portion after passing through the filter.

Thus, it is an object of the present invention to provide an electric power tool dust collection system that can effectively utilize exhaust after dust collection.

In order to achieve the above object, a first aspect of the present invention provides an electric power tool dust collection system including an electric power tool, to which a bit is mounted, a dust collection device mounted to the electric power tool and including a suction portion, a dust collection motor, a dust collection fan rotated by drive of the dust collection motor to generate a sucking force in the suction portion, and a dust collection portion that stores powder dust suctioned from the suction portion, and exhaust flow paths respectively formed in the electric power tool and the dust collection device to lead exhaust that has passed through the dust collection portion to a predetermined high-temperature portion of the electric power tool.

In this case, preferably, the exhaust flow paths communicate with each other when the dust collection device is mounted to the electric power tool.

Preferably, the exhaust flow path in the electric power tool is also used as a flow path for cooling air generated by rotation of a fan provided in the electric power tool.

Preferably, the electric power tool is a hammer drill that includes an output portion that includes a striking mechanism, and the high-temperature portion is the output portion.

Preferably, the electric power tool is a hammer drill that includes a motor housing portion that houses a motor with an output shaft directed upward, and the dust collection device is mounted in front of the motor housing portion.

Preferably, the dust collection device is mounted under the motor housing portion.

Preferably, the electric power tool is a hammer drill in which a housing is divided into a housing on an anti-vibration side and a housing on a non-anti-vibration side via an anti-vibration portion, and the exhaust flow path in the hammer drill is formed in a space between the housing on the anti-vibration side and the housing on the non-anti-vibration side.

Preferably, the dust collection device is mounted to the housing on the anti-vibration side.

Preferably, the exhaust flow path in the electric power tool is tubular.

Preferably, the exhaust flow path in the electric power tool is formed between an inner housing, which holds a tool holder into which the bit is inserted, and an outside housing, which covers an outside of the inner housing.

Preferably, the dust collection device is slid upward from a lower side of the electric power tool to be mounted.

Preferably, the exhaust flow path in the dust collection device is formed to project upward from a casing of the dust collection device; and an exhaust introduction port, which communicates with the exhaust flow path in the electric power tool and into which the exhaust flow path in the dust collection device is inserted when the dust collection device is mounted, is formed in a lower surface of the outside housing.

Preferably, the dust collection portion is a dust box removably mounted to the dust collection device.

According to the first aspect of the present invention, the exhaust flow paths which lead exhaust that has passed through the dust collection portion to the high-temperature portion of the electric power tool are respectively provided in the electric power tool and the dust collection device. Thus, exhaust after dust collection can be effectively utilized to cool the high-temperature portion, which leads to an increase in the life of the electric power tool.

In particular, the exhaust flow paths can be reliably connected to each other by allowing the exhaust flow paths to communicate with each other when the dust collection device is mounted to the electric power tool.

When the exhaust flow path in the electric power tool is also used as a flow path for cooling air generated by rotation of a fan provided in the electric power tool, the cooling air for a motor can also be utilized to cool the high-temperature portion.

When the high-temperature portion to be cooled is the output portion of the hammer drill, the output portion which tends to be at a high temperature can be cooled effectively.

When the dust collection device is mounted in front of the motor housing portion which houses a motor with an output shaft directed upward, the dust collection device can be mounted utilizing a space on the front side of the motor housing portion.

When the dust collection device is mounted under the motor housing portion, the system can be made compact in the front-rear direction by suppressing a projecting portion toward the front side.

When, in the electric power tool, a housing is divided into a housing on an anti-vibration side and a housing on a non-anti-vibration side via an anti-vibration portion, and the exhaust flow path in the electric power tool is formed in a space between the housing on the anti-vibration side and the housing on the non-anti-vibration side, the exhaust flow paths can be obtained conveniently utilizing the divided housing.

When the dust collection device is mounted to the housing on the anti-vibration side, a better anti-vibration effect can be obtained.

DETAILED DESCRIPTION

An embodiment of the present invention will be described below with reference to the drawings.

Figure 1:
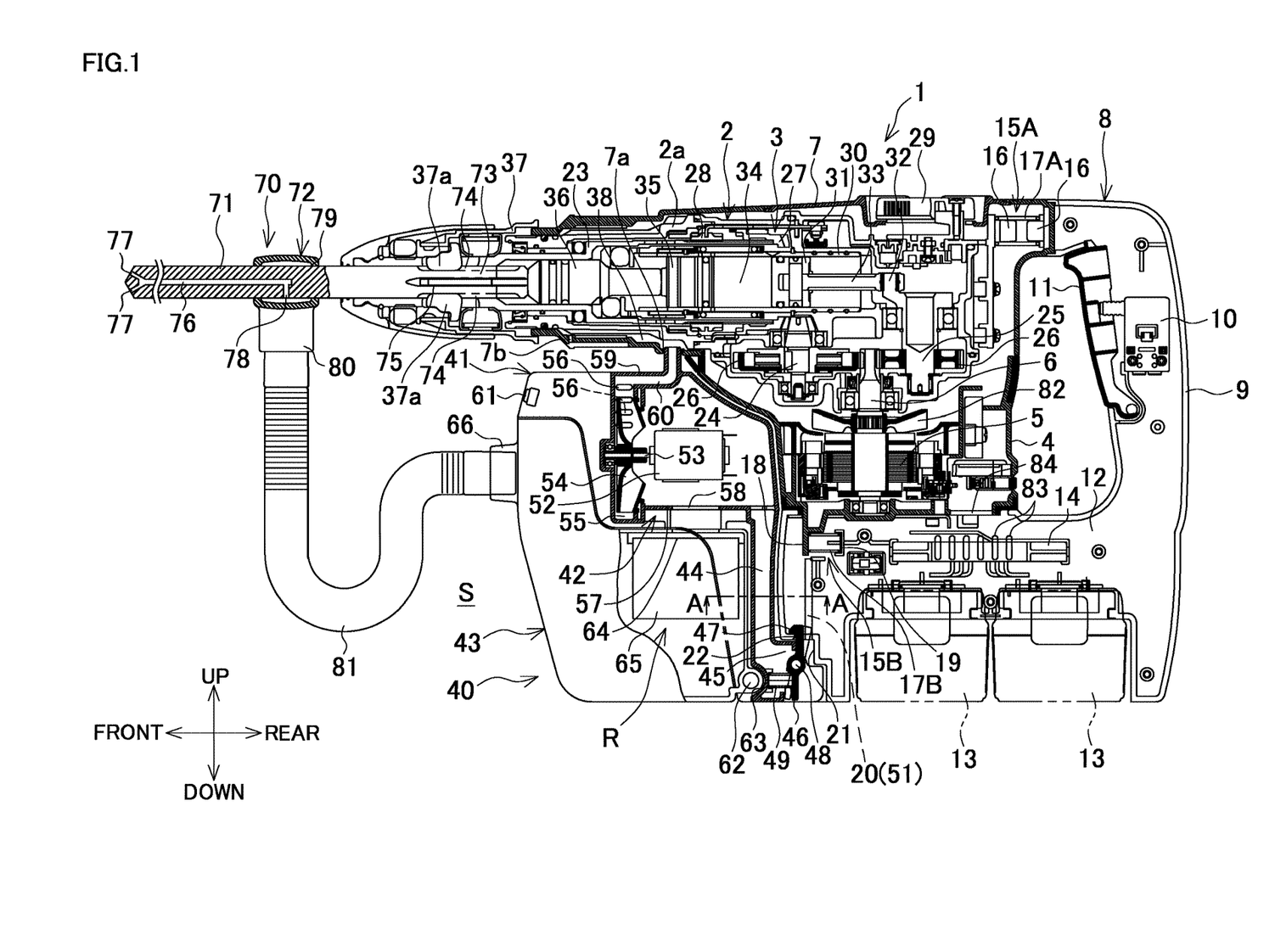
FIG. 1 is a center vertical sectional view of an electric power tool dust collection system (dust suction bit dust collection system) and a hammer drill.

FIG. 1 is a center vertical sectional view illustrating an example in which an electric power tool dust collection system (dust suction bit dust collection system) S is formed by mounting a dust collection device 40 and a dust suction bit 70 to a hammer drill 1.

First, the hammer drill 1 has an inner housing 2 that houses an output portion 3, a motor housing 4 coupled to the lower side of the inner housing 2 to house a motor 5 with an output shaft 6 thereof directed upward, an outside housing 7 that covers the outside of the inner housing 2, and a handle housing 8 provided to extend from the rear side of the outside housing 7 to the lower side of the motor housing 4.

The handle housing 8 includes a handle portion 9, which includes a switch 10 and a switch lever 11, extends in the up-down direction on the rear side of the outside housing 7 and a battery mount portion 12 that extends to the lower side of the motor housing 4 and that accommodates two, front and rear, battery packs 13, 13, which serve as a power source, at the lower portion of the battery mount portion 12. A controller 14 that has a control circuit board is housed in the battery mount portion 12 on the upper side of the battery packs 13 to extend in the front-rear direction.

The outside housing 7 is provided so as to be movable back and forth relative to the inner housing 2 and the motor housing 4. The upper end of the handle portion 9 of the handle housing 8 is coupled to the upper portion of the rear surface of the outside housing 7. The battery mount portion 12 is engaged so as to be movable back and forth relative to the lower portion of the motor housing 4.

Anti-vibration portions 15A, 15B are provided between the inner housing 2 and the outside housing 7 and between the motor housing 4 and the handle housing 8, respectively. The anti-vibration portion 15A is provided in the outside housing 7, and formed from front and rear bosses 16, 16 provided so as to face each other between the rear surface of the inner housing 2 and the inner surface of the rear portion of the outside housing 7, and a coil spring 17A externally mounted on the two bosses 16, 16. The anti-vibration portion 15B is provided in the battery mount portion 12 of the handle housing 8, and formed from a projecting piece 18 and a coil spring 17B. A projecting piece 18 is provided on the lower surface of the motor housing 4 to project downward into the battery mount portion 12. A coil spring 17B is provided to extend in the front-rear direction between the projecting piece 18 and the receiving rib 19 provided on the rear side of the projecting piece 18 to extend in the battery mount portion 12.

Hence, the outside housing 7 and the handle housing 8 constitute an anti-vibration housing that is movable back and forth relative to the inner housing 2 and the motor housing 4 against the bias of the coil springs 17A, 17B. An anti-vibration housing is normally elastically biased by the coil springs 17A, 17B toward a retracted position in FIG. 1 at which the upper end of the front portion of the battery mount portion 12 abuts against the base end of the projecting piece 18.

Figure 2:
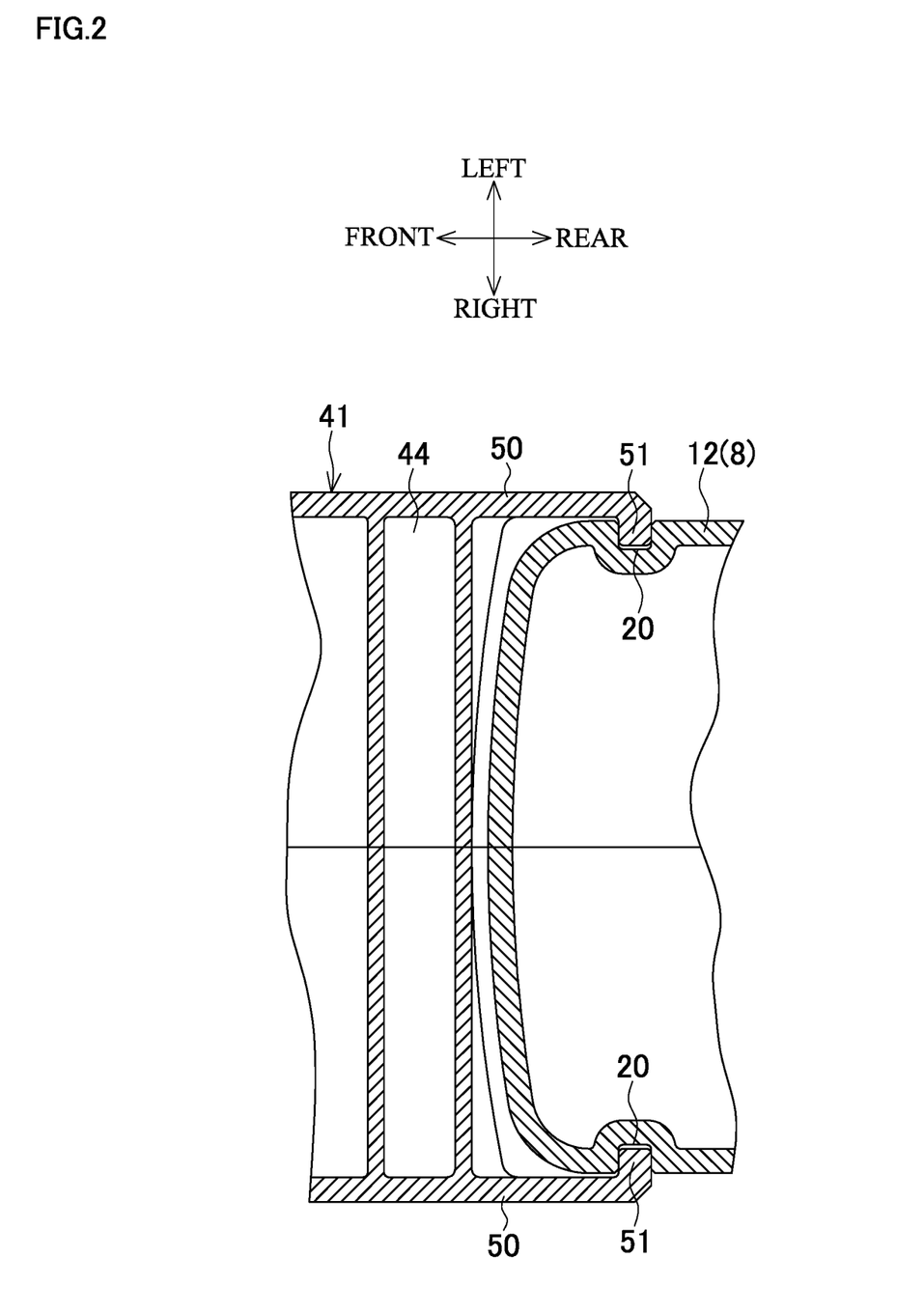
FIG. 2 is a sectional view taken along the line A-A in FIG. 1.

As illustrated in FIG. 2, guide grooves 20, 20 that extend in the up-down direction are provided to be recessed in the right and left side surfaces of the front portion of the battery mount portion 12. A recessed portion 21, in the upper surface of which an engagement hole 22 is formed, is formed at the center, in the right-left direction, of the lower portion of the front side of the battery mount portion 12.

The output portion 3 has a tubular tool holder 23 held by a tubular barrel portion 2a on the front side of the inner housing 2 to extend in the front-rear direction. The output shaft 6 of the motor 5 projects into the inner housing 2 on the lower side of the tool holder 23. An intermediate shaft 24 and a crankshaft 25 are supported on the front side and the rear side, respectively, of the output shaft 6 to extend in the up-down direction. Gears 26, 26 provided on the two shafts are meshed with a pinion provided at the upper end of the output shaft 6. A bevel gear provided at the upper end of the intermediate shaft 24 is meshed with a bevel gear 27 externally mounted on the tool holder 23 so as to be rotatable. The bevel gear 27 transfers rotation of the intermediate shaft 24 to the tool holder 23 when a changeover sleeve 28, which is spline-coupled to the outer periphery of the tool holder 23, is retracted and engaged. The front-rear position of the changeover sleeve 28 is switchable by a changeover knob 29 provided on the upper surface of the outside housing 7.

A cylinder 30 is held at the rear portion of the tool holder 23, and houses a piston 31 so that the piston 31 is movable back and forth. The piston 31 and an eccentric pin 32, which is provided to the crankshaft 25 on the rear side of the piston 31, are coupled to each other via a connecting rod 33. A striker 35 is housed in the cylinder 30 on the front side of the piston 31 via a pneumatic chamber 34 so as to be movable back and forth. An impact bolt 36 that abuts against an inserted bit is provided in the tool holder 23 on the front side of the striker 35. An operation sleeve 37 that serves as an operation member for mount/unmount operation of the bit is provided at the front end of the tool holder 23. Chuck members 37a, 37a to be engaged with a retention recessed portion 74, to be discussed later, provided in the bit via the tool holder 23 are provided on the inner side of the front end of the operation sleeve 37. The bit can be mounted and unmounted by locking and unlocking movement of the chuck members 37a in the radial direction by frontward and rearward slide operation of the operation sleeve 37.

In the hammer drill 1, when the output shaft 6 is rotated, the crankshaft 25 is always rotated to move the piston 31 back and forth, and therefore the striker 35 which is moved in conjunction with the piston 31 strikes the impact bolt 36. Hence, a hammer drill mode in which the tool holder 23 is rotated via the bevel gear 27 is entered when the changeover sleeve 28 is switched to a retracted position by operating the changeover knob 29. On the other hand, a hammer mode in which the tool holder 23 is not rotated and only strikes are provided is entered when the changeover sleeve 28 is switched to an advanced position.

The dust collection device 40 has a box-like casing 41. The casing 41 is mounted to the battery mount portion 12 on the front side of the motor housing 4 and the handle housing 8 of the hammer drill 1. A dust box 43 that serves as a dust collection portion is removably mounted to a coupling portion 42 provided on the lower side of the casing 41.

A rear wall portion 44 that extends downward along the front surface of the battery mount portion 12 is formed at the rear portion of the casing 41. A projecting portion 45 to be fitted with the recessed portion 21 of the battery mount portion 12 is provided at the center, in the right-left direction, of the lower end of the rear wall portion 44 to project rearward. A hook plate 46, from the upper end of which a hook 47 projects forward, is supported on the rear surface of the projecting portion 45 by a pin 48 that extends in the right-left direction so as to be swingable back and forth. A coil spring 49 that presses the lower end of the hook plate 46 rearward is provided in the projecting portion 45, and biases the hook plate 46 toward a front swing position at which the upper end of the hook plate 46 abuts against the back surface of the projecting portion 45.

As illustrated in FIG. 2, a pair of lateral plates 50, 50 provided on the right and the left of the rear wall portion 44 project rearward with respect to the rear wall portion 44 to hang over both the side surfaces of the battery mount portion 12. The engagement pieces 51, 51 to be engaged with the guide grooves 20, 20 which are provided on the right and the left of the battery mount portion 12 are formed at the rear end of the lateral plates 50.

When the casing 41 is slid from the lower side with the engagement pieces 51, 51 aligned with the guide grooves 20, 20, the projecting portion 45 is fitted with the recessed portion 21 from the lower side so that the hook 47 of the hook plate 46 can be engaged with the engagement hole 22.

A dust collection motor 52 is housed in the casing 41 with an output shaft 53 thereof directed forward. A dust collection fan 54 is provided at the front end of the output shaft 53. A fan housing chamber 55 that houses the dust collection fan 54 is defined in the casing 41. Device-side exhaust ports 56 that communicate with the fan housing chamber 55 are formed in the side surfaces of the casing 41.

A communication port 58 that communicates with the suction side of the fan housing chamber 55 is formed in a lower plate 57 of the casing 41. A tubular exhaust flow path 60 that communicates with the discharge side of the fan housing chamber 55 is formed in an upper plate 59 of the casing 41 to project upward.

An exhaust introduction port 7*a*, into which the exhaust flow path 60 is inserted when the dust collection device 40 is mounted, is formed in the outside housing 7 of the hammer drill 1 on the lower side of the barrel portion 2*a*, and a body-side exhaust port 7*b* is formed in the lower surface of the outside housing 7 on the front side of the exhaust introduction port 7*a*, which enables air discharged from the exhaust flow path 60 to flow into a tubular flow path 38 between the barrel portion 2*a* and the outside housing 7.

A light 61 that uses a light emitting diode (LED) is provided at the front end of the upper portion in the casing 41 to enable illumination of the front side of the bit which is mounted to the tool holder 23 with the casing 41 mounted to the hammer drill 1.

Terminals (not illustrated) that are electrically connected to each other with the casing 41 mounted are provided between the rear wall portion 44 of the casing 41 and the battery mount portion 12 of the handle housing 8. The electrical connection between the terminals allows the dust collection motor 52 and the light 61 to be powered by the battery packs 13 via the controller 14. The dust collection motor 52 is driven and the light 61 is lighted on when the switch 10 is turned on.

The dust box 43 is a box-like body to be mounted to the coupling portion 42 from the front side, and is removably mounted to the coupling portion 42 with an engagement shaft 62 provided at the lower end of the rear portion of the dust box 43 engaged with a receiving recessed portion 63 provided at the lower end of the front surface of the rear wall portion 44 and with an engagement portion (not illustrated) provided on the inner surface of the upper end of the dust box 43 engaged with the lower surface of the casing 41. A filter housing portion 64 positioned on the lower side of the communication port 58 when the dust box 43 is mounted is provided in the dust box 43. A filter 65 made of paper and folded in the right-left direction with folding lines extending in the front-rear direction is provided in the filter housing portion 64 to separate the communication port 58 and a space in the dust box 43 from each other. A tubular introduction port 66 is provided on the front surface of the upper portion of the dust box 43 to project forward.

In this manner, a dust collection path R that allows air suctioned from the introduction port 66 to enter the dust box 43, pass through the filter 65, and reach the fan housing chamber 55 from the communication port 58 is formed in the dust collection device 40.

The dust suction bit 70 which is mounted to the hammer drill 1 includes a bit body 71 made of metal and including cutting edges at the front end thereof, and a hose attachment portion 72 made of a resin and mounted to the bit body 71. A pair of retention recessed portions 74, 74 to be inserted and mounted to the tool holder 23 of the hammer drill 1 and a pair of turn stopping grooves 75, 75 with different phases are formed at the rear end of a shank portion 73, which is formed at the rear end of the bit body 71, to extend in the axial direction.

A dust suction path 76 is formed in the axial center of the bit body 71. The front end of the dust suction path 76 is bifurcated to open a pair of suction ports 77, 77 in the front end surface of the bit body 71. The rear end of the dust suction path 76 is bent in the radial direction at the mount position of the hose attachment portion 72 to open an outlet port 78 in the peripheral surface of the bit body 71.

The hose attachment portion 72 is composed of a tubular exterior portion 79 externally mounted so as to be rotatable relative to the bit body 71, and a tubular portion 80 provided to be continuous with the exterior portion 79 to project outward in the radial direction of the bit body 71 to open at the distal end thereof. The exterior portion 79 communicates with the tubular portion 80 so that the outlet port 78 opens in the tubular portion 80.

A flexible hose 81 is inserted and connected between the tubular portion 80 and the introduction port 66 of the dust collection device 40, which enables the sucking force at the introduction port 66 to be generated at the tubular portion 80. The flexible hose 81 is longer than the linear distance between the tubular portion 80 and the introduction port 66, and slightly deflected downward.

In the thus configured electric power tool dust collection system S, when mounting the dust collection device 40 to the hammer drill 1, one of the dust collection device 40 and the hammer drill 1 is slid in the up-down direction with the casing 41 positioned on the front side of the battery mount portion 12 of the hammer drill 1 such that the engagement pieces 51, 51 of the lateral plates 50, 50 are engaged with the guide grooves 20, 20 of the battery mount portion 12 from the lower side. Then, the battery mount portion 12 is fitted and coupled between the lateral plates 50, 50, and the hook 47 of the hook plate 46 is engaged with the engagement hole 22, which completes mounting. At this time, the exhaust flow path 60 of the casing 41 is inserted into the exhaust introduction port 7a of the outside housing 7 so that the fan housing chamber 55 communicates with the tubular flow path 38. When the dust collection device 40 is mounted, the front surface of the casing 41 is positioned on the rear side with respect to the chuck member 37a which is provided inside the operation sleeve 37.

When the switch 10 is turned on by pushing in the switch lever 11 of the hammer drill 1 with the distal end of the bit body 71 of the dust suction bit 70, which is mounted to the tool holder 23, pressed against a surface to be processed of a workpiece, the motor 5 is driven to rotate the output shaft 6, which rotates the intermediate shaft 24 and the crankshaft 25. Since the piston 31 always makes reciprocal motion irrespective of which of the hammer drill mode and the hammer mode is selected as discussed earlier, the bit body 71 is struck by the striker 35, which operates in conjunction with the piston 31, via the impact bolt 36.

The dust collection motor 52 in the casing 41 is also driven by power supplied from the controller 14 to rotate the dust collection fan 54, and therefore a negative pressure is caused in the dust collection path R to generate a sucking force in the flexible hose 81. Hence, in the dust suction bit 70, outside air is sucked from the suction ports 77 via the hose attachment portion 72 and the dust suction path 76. The sucked outside air passes through the dust suction path 76 and the hose attachment portion 72, and enters the dust box 43 from the introduction port 66 via the flexible hose 81. The outside air passes through the filter 65, and reaches the fan housing chamber 55 from the communication port 58. A part of the outside air is discharged from the device-side exhaust port 56 to the outside. Thus, powder dust generated from the workpiece is suctioned into the suction ports 77, enters the dust box 43 via the hose attachment portion 72 and the flexible hose 81, and is captured by the filter 65 to be stored in the dust box 43.

On the other hand, the other part of the outside air which has entered the fan housing chamber 55 passes through the exhaust introduction port 7a of the outside housing 7 from the exhaust flow path 60 to reach the tubular flow path 38, and passes between the barrel portion 2a and the outside housing 7 to be discharged from the body-side exhaust port 7b. This flow of air cools the barrel portion 2a.

The output shaft 6 of the motor 5 is provided with a motor cooling fan 82. Air suction ports 83 are formed in the side surfaces of the battery mount portion 12 on the right and left outer sides of the controller 14. An opening 84 that communicates with a space in the battery mount portion 12 is formed in the bottom surface of the motor housing 4. Hence, when the motor cooling fan 82 is rotated along with rotation of the output shaft 6, outside air is suctioned from the air suction ports 83 to cool the controller 14, thereafter enters the motor housing 4 from the opening 84 to cool the motor 5, and is discharged from an exhaust port (not illustrated) provided in the outside housing 7. A part of the cooling air is merged with the tubular flow path 38 to cool the barrel portion 2a, and thereafter is discharged from the body-side exhaust port 7b.

A rotational bias force in the rotational direction of the bit body 71 is applied to the hose attachment portion 72 by a friction force generated between the bit body 71 and the exterior portion 79 of the hose attachment portion 72 along with rotation of the bit body 71. Since the flexible hose 81 is connected between the tubular portion 80 and the introduction port 66, however, rotation of the hose attachment portion 72 is suppressed. The rotation suppression effect can be provided by the flexible hose 81 even if powder dust or the like enters a slide portion of the exterior portion 79 to degrade slidability.

Figure 3:
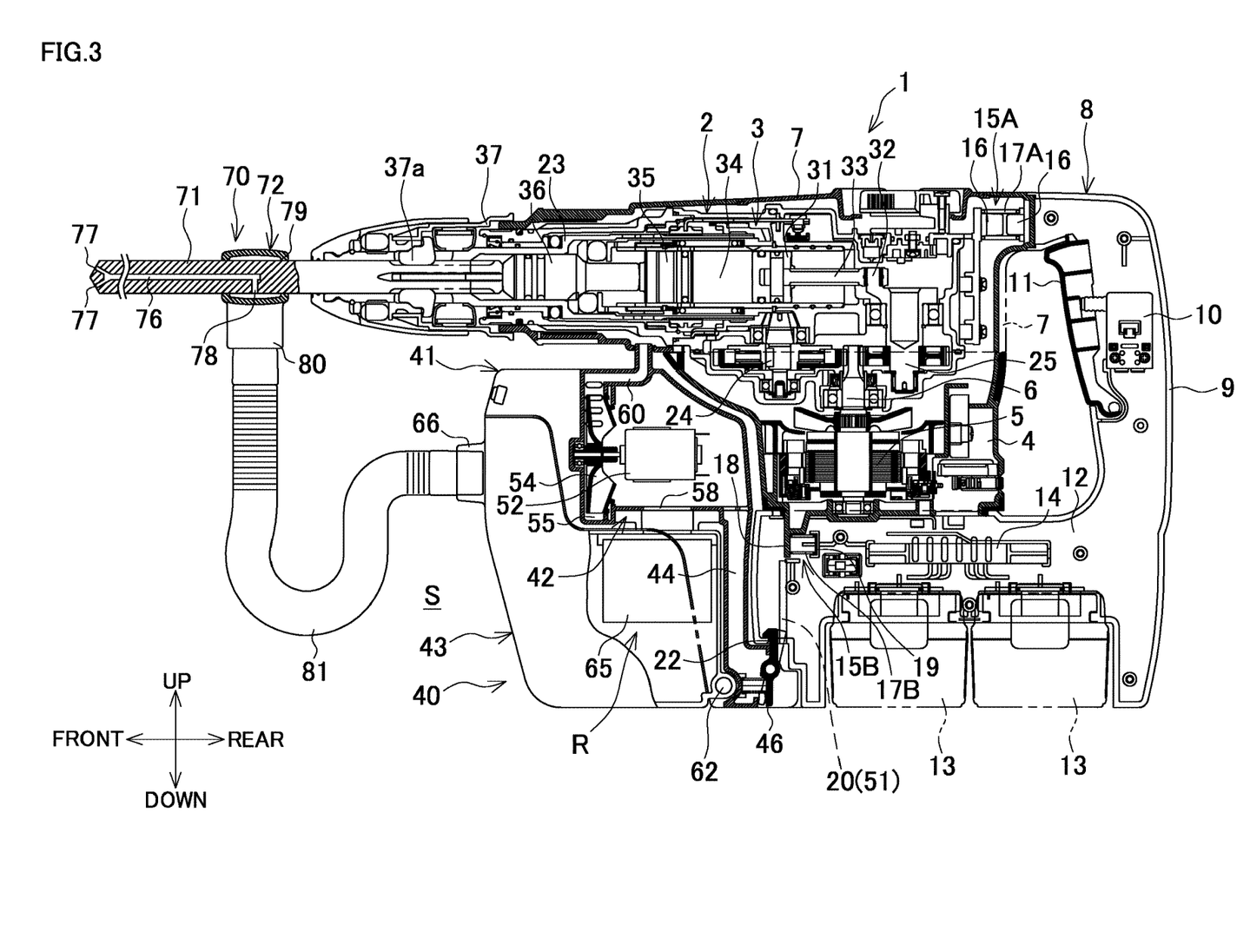
FIG. 3 is a center vertical sectional view illustrating the function of an anti-vibration portion of the hammer drill.

The inner housing 2 and the motor housing 4 are moved back and forth by vibration generated during drilling work. However, vibration is mitigated by the anti-vibration portions 15A, 15B relatively moving the outside housing 7 and the handle housing 8 back and forth as indicated by the chain double-dashed lines in FIG. 3, which suppresses vibration transmitted to the hands of a worker. At this time, the dust collection device 40 is also mounted to the battery mount portion 12 of the handle housing 8 which is vibration-isolated, which increases the overall weight of the handle housing 8 and makes the handle housing 8 less likely to vibrate.

When removing the dust collection device 40, on the other hand, one of the hammer drill 1 and the dust collection device 40 is slid in the direction away from the other, conversely to when mounting, with the lower end of the hook plate 46 pushed forward to disengage the hook 47 from the engagement hole 22. Then, the engagement pieces 51, 51 of the lateral plates 50, 50 are disengaged from the guide grooves 20, 20 of the battery mount portion 12, which completes removal.

To discard the powder dust which is stored in the dust box 43, the upper portion of the dust box 43 is pulled forward to be disengaged from the casing 41, and tilted forward about the engagement shaft 62. Then, the dust box 43 can be detached from the coupling portion 42, which allows the powder dust which is stored inside to be discarded.

Effect of the invention of electric power tool dust collection system S is described as below.

The electric power tool dust collection system S according to the embodiment described above includes the hammer drill 1, to which the dust suction bit 70 is mounted, and the dust collection device 40 mounted to the hammer drill 1. The dust collection device 40 includes the suction portion (introduction port 66), the dust collection motor 52, the dust collection fan 54 rotated by drive of the dust collection motor 52 to generate a sucking force in the introduction port 66, and the dust collection portion (dust box 43) that stores powder dust suctioned from the introduction port 66. The electric power tool dust collection system S also includes the exhaust flow paths (exhaust flow path 60 and tubular flow path 38) respectively formed in the hammer drill 1 and the dust collection device 40 to lead exhaust that has passed through the dust box 43 to a high-temperature portion (output portion 3) of the hammer drill 1. Thus, exhaust after dust collection can be effectively utilized to cool the output portion 3, which leads to an increase in the life of the hammer drill 1.

In particular, the exhaust flow path 60 and the tubular flow path 38 communicate with each other when the dust collection device 40 is mounted to the hammer drill 1. Thus, the exhaust flow path 60 and the tubular flow path 38 can be reliably connected to each other.

The tubular flow path 38 is also used as a flow path for cooling air generated by rotation of the motor cooling fan 82 provided in the hammer drill 1. Thus, cooling air for the motor 5 can also be utilized to cool the output portion 3.

The high-temperature portion to be cooled is the output portion 3. Thus, the output portion 3 which tends to be at a high temperature can be cooled effectively.

The dust collection device 40 is mounted in front of the motor housing portion (motor housing 4) which houses the motor 5 with an output shaft 6 directed upward. Thus, the dust collection device 40 can be mounted utilizing a space on the front side of the motor housing 4. The dust collection device 40 is mounted toward the lower side of the motor housing 4. Thus, the system can be made compact in the front-rear direction by suppressing a projecting portion toward the front side.

In the hammer drill 1, a housing is divided into a housing on an anti-vibration side and a housing on a non-anti-vibration side via the anti-vibration portions 15A, 15B, and the tubular flow path 38 is formed in a space between the housing (inner housing 2) on the non-anti-vibration side and the housing (outside housing 7) on the anti-vibration side. Thus, the tubular flow path 38 can be obtained conveniently utilizing the divided housing.

The dust collection device 40 is mounted to the housing (handle housing 8) on the anti-vibration side. Thus, a better anti-vibration effect can be obtained.

The configuration of the exhaust flow path is not limited to that according to the embodiment described above. The exhaust introduction port and the body-side exhaust port of the outside housing may be reversed in the front-rear direction, and the exhaust flow path on the dust collection device side may be connected to the front side. The body-side exhaust port is not limited to being formed in the lower surface of the outside housing, and may be formed in a side surface or the upper surface. A plurality of body-side exhaust ports may be formed. The exhaust flow path on the hammer drill side may not be tubular.

The arrangement of the dust collection motor and the dust collection fan is not limited to that according to the embodiment described above. The dust collection motor and the dust collection fan may be provided on the lower side of the casing, or may be directed differently. Power is not limited to being obtained from the hammer drill, and a battery may be mounted on the casing.

The dust collection device may be mounted to the hammer drill by sliding the casing in the front-rear direction, rather than in the up-down direction, and the dust collection device may be mounted to the lower portion of the handle housing.

Besides, a dust suction bit is provided in the embodiment described above. However, the invention of the electric power tool dust collection system is not limited to use of a dust suction bit. Hence, the connection between the bit and the suction portion is not limited to a structure that uses a flexible hose. The present invention is also applicable to a structure in which a bit is penetrated by a suction portion provided in a nozzle that projects from a casing of a dust collection device.

Effect of the invention of dust suction bit dust collection system and hammer drill is described as below.

The dust suction bit dust collection system S and the hammer drill 1 according to the embodiment described above include the dust suction bit 70 mounted to the hammer drill 1 and obtained by externally mounting the suction head (hose attachment portion 72) for dust suction on the bit body 71. The dust suction bit dust collection system S and the hammer drill 1 also include the dust collection device 40 mounted to the hammer drill 1 and including the introduction port 66 which generates a sucking force and the dust collection portion (dust box 43) that stores powder dust suctioned from the introduction port 66. Further, the dust suction bit dust collection system S and the hammer drill 1 include the flexible hose 81 connected between the hose attachment portion 72 and the introduction port 66. Thus, durability can be improved by preventing breakage of the hose attachment portion 72, even if the slidability between the bit body 71 and the hose attachment portion 72 is degraded.

In particular, the dust collection device 40 includes the dust collection motor 52 and the dust collection fan 54 for generating a sucking force. Thus, the dust collection device 40 alone can generate a sucking force, which improves usability.

The introduction port 66 is provided in the front surface of the dust collection device 40. Thus, the flexible hose 81 can be connected easily, and the length of the flexible hose 81 can be shortened, which is less likely to obstruct work.

The front surface of the dust collection device 40 is positioned on the rear side with respect to the chuck member 37a when the dust collection device 40 is mounted to the hammer drill 1. Thus, an operation to mount and unmount the dust suction bit 70 using the operation sleeve 37 is not obstructed even if the dust collection device 40 is mounted.

The hammer drill 1 has the housing (inner housing 2) that houses the output portion 3, and the anti-vibration housing (outside housing 7 and handle housing 8) coupled so as to be movable relative to the inner housing 2 via the anti-vibration portions 15A, 15B, and the dust collection device 40 is mounted to the handle housing 8 on the anti-vibration side. Thus, a higher anti-vibration effect can be obtained.

The dust collection device 40 has the exhaust flow path 60 that can supply exhaust generated by the dust collection fan 54 to the output portion 3 of the hammer drill 1 when the dust collection device 40 is mounted to the hammer drill 1. Thus, air for dust collection can be effectively utilized to cool the output portion 3, which leads to an increase in the life of the hammer drill 1.

In the embodiment described above, the introduction port of the dust collection device is not limited to being formed in the front surface of the dust box, and may be provided in the front surface of the casing. Alternatively, the introduction port may be formed in a side surface or the upper surface, rather than the front surface, of the dust collection device.

The arrangement of the dust collection motor and the fan is not limited to that according to the embodiment described above. The dust collection motor and the fan may be provided on the lower side of the casing, or may be directed differently. Power is not limited to being obtained from the hammer drill, and a battery may be mounted on the casing.

The dust collection device may be mounted to the hammer drill by sliding the casing in the front-rear direction, rather than in the up-down direction, and the dust collection device may be mounted to the lower portion of the hammer drill.

Next, a different embodiment of the present invention will be described. It should be noted, however, that components that are the same as those according to the embodiment described above are given the same reference numerals to omit redundant description.

Figure 4:
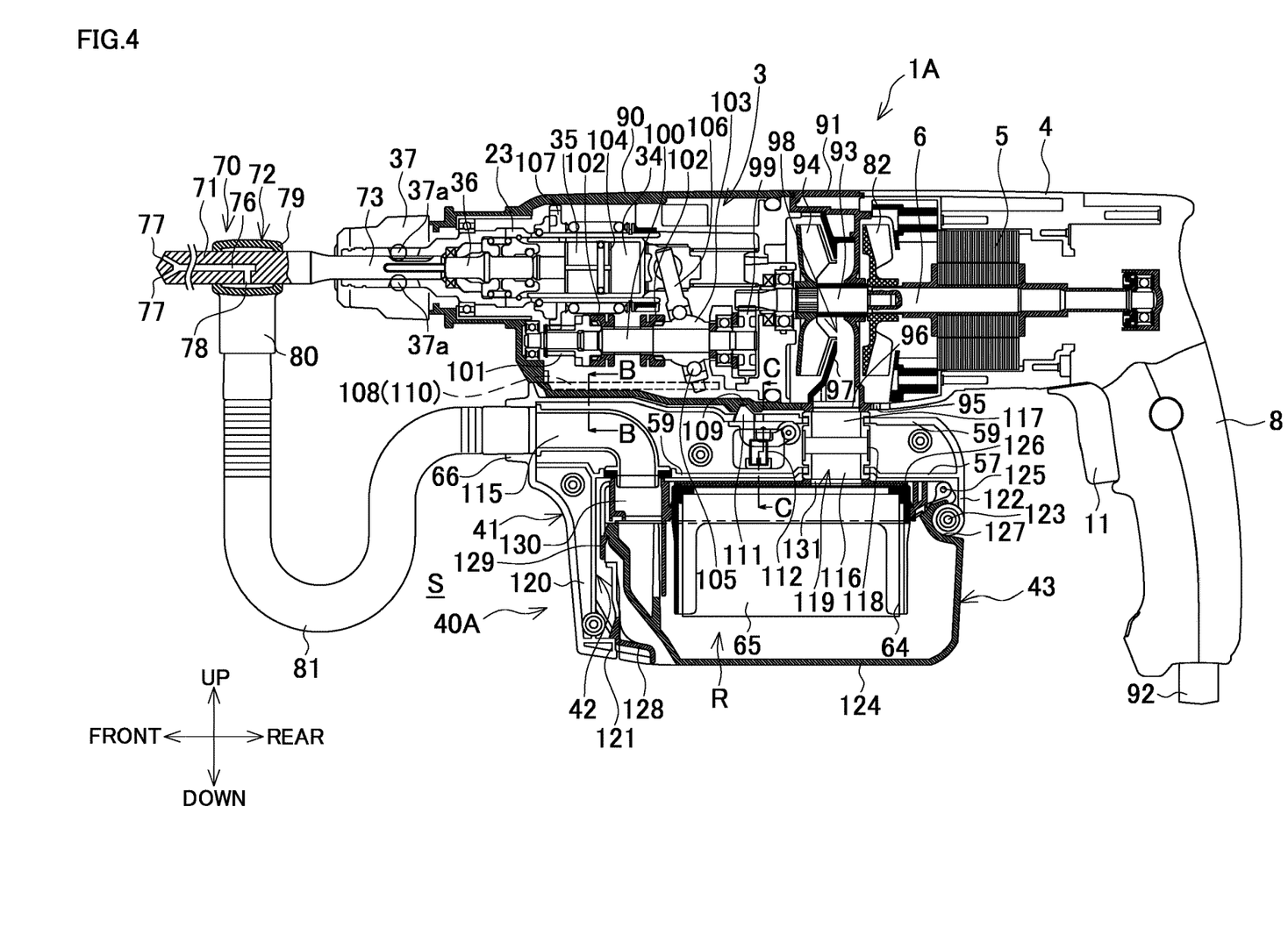
FIG. 4 is a center vertical sectional view of a dust suction bit dust collection system and a hammer drill.

As illustrated in FIG. 4, a hammer drill 1A includes a front housing 90 that houses the output portion 3 and the motor housing 4 which is disposed on the rear side of the front housing 90. The motor housing 4 houses the motor 5 with the output shaft 6 directed forward. A hammer drill 1A also includes an intermediate housing 91 interposed between the front housing 90 and the motor housing 4. The handle housing 8 which includes the switch 10 (not illustrated in FIG. 4) and the switch lever 11 is coupled to the rear end of the motor housing 4 so as to extend downward. A power cord 92 is connected to the lower end of the handle housing 8.

An extension shaft 93 that penetrates the intermediate housing 91 to project into the front housing 90 is coaxially coupled to the front end of the output shaft 6. The motor cooling fan 82 which is positioned in the motor housing 4 is integrally coupled to the output shaft 6. A dust collection fan 94 positioned in the intermediate housing 91 is integrally coupled to the extension shaft 93. Air suction ports (not illustrated) that suction cooling air for the motor 5 are formed in the side surfaces of the rear portion of the motor housing 4. An exhaust port 95 is formed in the lower surface of the motor housing 4. A connection port 96 to be connected to a suction path, to be discussed later, of a dust collection device 40A is formed in the lower surface of the intermediate housing 91. A baffle plate 97 that covers the outer peripheral side of the dust collection fan 94 from the rear side is provided on the front side of the connection port 96.

Hence, an air suction chamber 98 is formed in the intermediate housing 91. Outside air is suctioned from the connection port 96 into the air suction chamber 98 by rotation of the dust collection fan 94, and discharged from an exhaust port (not illustrated) provided in a side surface of the intermediate housing 91.

In the output portion 3, an intermediate shaft 100, to which torque is transferred via a gear 99 meshed with a pinion provided at the front end of the extension shaft 93, is supported in the front housing 90 to extend in the front-rear direction. The intermediate shaft 100 includes a first gear 101, clutches 102, 102, and a boss sleeve 103 provided thereon in this order from the front side. The tool holder 23 is supported in parallel with the intermediate shaft 100 on the upper side of the intermediate shaft 100. A piston cylinder 104 is freely inserted on the rear side of the tool holder 23. An arm 106 is externally mounted on the boss sleeve 103 via a swash bearing 105 with an inclined axis. The upper end of the arm 106 is coupled to the rear end of the piston cylinder 104. The striker 35 is housed inside the piston cylinder 104 via the pneumatic chamber 34 so as to be movable back and forth, and can strike the impact bolt 36 which is provided on the front side of the striker 35. The first gear 101 is meshed with a second gear 107 mounted to the tool holder 23.

Figure 5A:
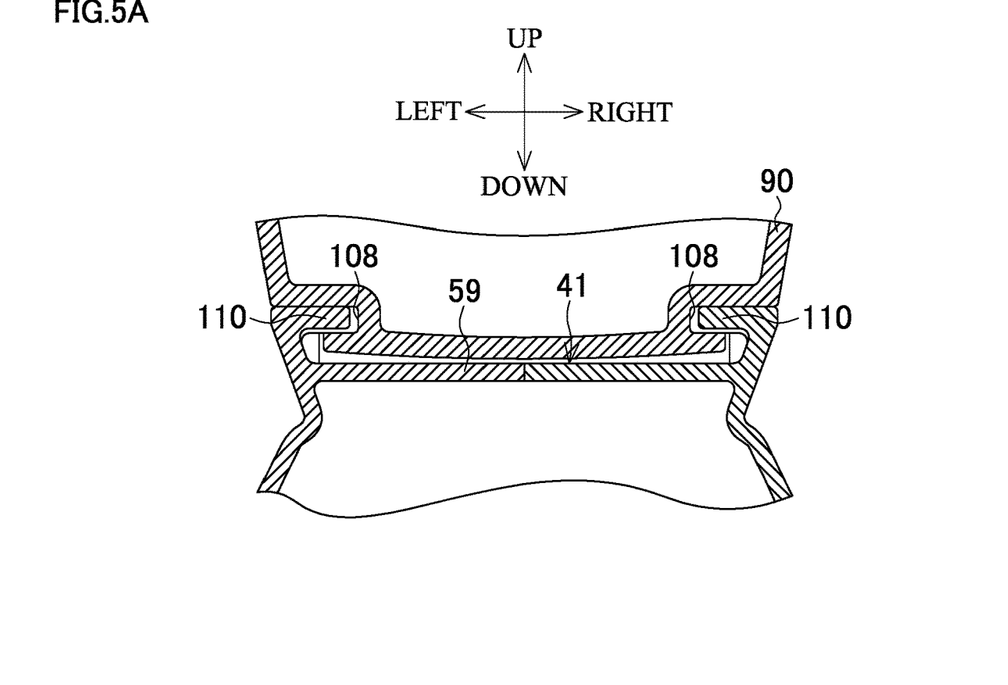
FIG. 5A is a sectional view taken along the line B-B in FIG. 4.

As illustrated in FIG. 5A, a pair of guide grooves 108, 108 are formed on both the right and left sides of the lower portion of the front housing 90 to extend in the front-rear direction. An engagement recessed portion 109 is formed at the center in the right-left direction on the rear side of the guide grooves 108, 108 by two projections with inclined front and rear surfaces.

Figure 5B:
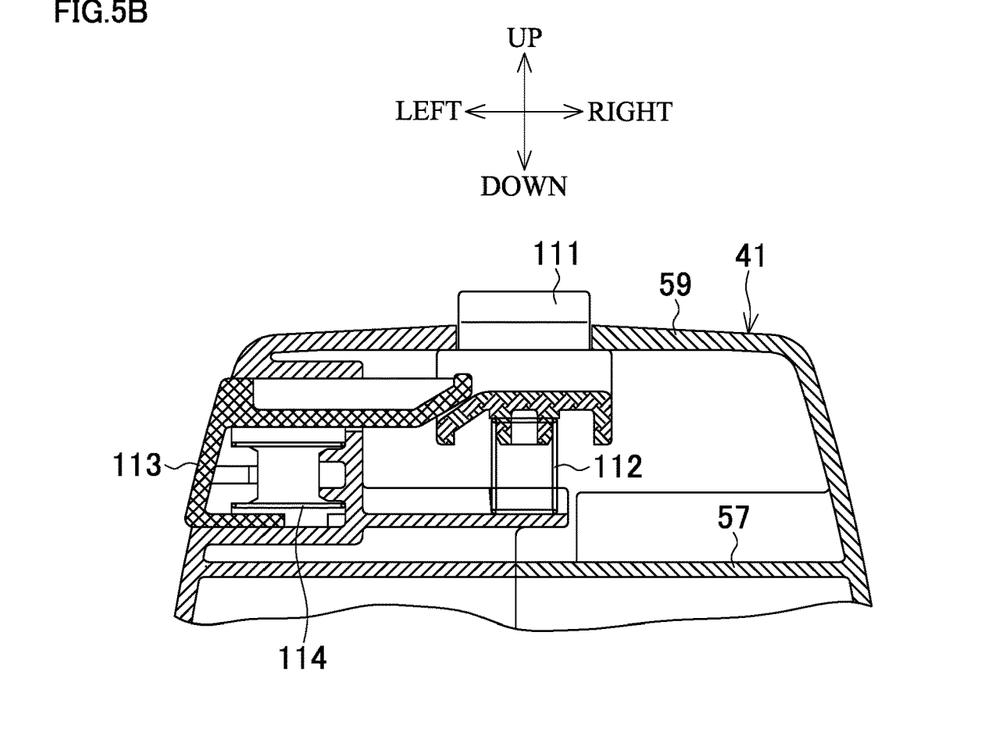
FIG. 5B is a sectional view taken along the line C-C in FIG. 4.

The dust collection device 40A has the box-like casing 41, which is obtained by assembling right and left half casings to each other and which extends in the front-rear direction, and the dust box 43 is removably mounted to the coupling portion 42 which is provided on the lower side of the casing 41. A pair of right and left guide rails 110, 110, which are engageable with the guide grooves 108, 108 of the hammer drill 1A from the rear outer side, are formed on the upper plate 59 of the casing 41. As illustrated in FIG. 5B, a hook 111, the base end of which is coupled so as to be rotatable in the casing 41 and the distal end of which is engageable with the engagement recessed portion 109, is provided on the rear side of the guide rails 110, 110 as being biased by a coil spring 112 toward a projected position from the upper surface of the upper plate 59. An operation button 113 that is slidable in the right-left direction and that is biased by a coil spring 114 toward a projected position on the left side surface is provided on the left side surface of the casing 41. The right end portion of the operation button 113 abuts against the left side surface of the hook 111 over respective inclined surfaces. Hence, when the operation button 113 is pushed in against the bias of the coil spring 114, the hook 111 can be rotated downward against the bias of the coil spring 112 so that the distal end of the hook 111 can be retracted from the upper surface of the upper plate 59.

The introduction port 66 is provided at the upper portion of the front surface of the casing 41 to project forward. An elbow 115, which is an L-shaped tube, is connected between the introduction port 66 and the lower plate 57 of the casing 41 in the casing 41 so that the lower end of the elbow 115 projects into the coupling portion 42.

A lower tube 116, which penetrates the lower plate 57 so that the lower end of the lower tube 116 projects into the coupling portion 42, and an upper tube 117, which penetrates the upper plate 59 so that the upper end of the upper tube 117 projects, are coaxially coupled to each other in the casing 41 on the rear side of the elbow 115. The lower tube 116 and the upper tube 117 are coupled to each other by a flexible coupling duct 118. The lower tube 116, the upper tube 117, and the coupling duct 118 form a suction path 119 that penetrates the casing 41 in the up-down direction.

A front wall portion 120, which forms the front side of the coupling portion 42, is provided at the front portion of the casing 41 to project downward. An engagement projecting portion 121, which is engageable with an operation piece 128, to be discussed later, of the dust box 43, is provided at the lower end of the front wall portion 120 to project rearward.

A rear plate 122, which projects downward from the rear end of the lower plate 57 and which is shorter than the front wall portion 120, is formed at the rear portion of the casing 41. A receiving shaft 123, which extends in the right-left direction, is formed on the front side of the lower end of the rear plate 122.

The dust box 43 includes a box body 124 in the shape of a deep bottomed box that opens in the upper surface thereof, and a lid body 126 in a vertically long rectangular shape rotatably coupled to the box body 124 on the opening side and the rear side by a hinge shaft 125. A groove 127, which can be fitted with the receiving shaft 123 of the rear plate 122, is recessed in the rear surface of the box body 124 on the lower side with respect to the hinge shaft 125 to extend in the right-left direction. The operation piece 128, which is elastically engaged with the engagement projecting portion 121 of the front wall portion 120 of the casing 41, is connected to the front surface of the box body 124.

A lid engagement piece 129 is provided at the front end portion of the lid body 126. When the opening of the box body 124 is in a closed state, the lid engagement piece 129 is engaged with the front surface of the box body 124 to maintain the closed state. A tubular inlet port 130, into which the lower end of the elbow 115 is inserted when the dust box 43 is coupled to the coupling portion 42, is provided on the rear side of the lid engagement piece 129. On the other hand, an outlet port 131, which communicates with the lower tube 116 when the dust box 43 is coupled to the coupling portion 42, is formed in the lid body 126 close to the rear thereof. The filter housing portion 64 which holds the filter 65 is attached to the lower surface of the lid body 126 so as to cover the outlet port 131 from the lower side.

In the case of mounting the thus formed dust box 43 to the coupling portion 42, the lid engagement piece 129 is engaged with the box body 124 to close the lid body 126, and the groove 127 is fitted with the receiving shaft 123 of the coupling portion 42 from the lower front side with the lid engagement piece 129 on the front side and the lid body 126 on the upper side. When the dust box 43 is raised upward from this oblique state to be pushed into the coupling portion 42, the dust box 43 is mounted to the coupling portion 42 with the operation piece 128 engaged with the engagement projecting portion 121. In this mounted state, the inlet port 130 is fitted with the lower end of the elbow 115 so that the elbow 115 and the inlet port 130 are connected to each other, and the outlet port 131 abuts against the lower end of the lower tube 116 to communicate with the suction path 119. In this manner, a dust collection path R that passes from the introduction port 66 through the elbow 115 to enter the dust box 43, passes through the filter 65, and reaches the suction path 119 is formed in the dust collection device 40A.

In the thus configured dust suction bit dust collection system S, when mounting the dust collection device 40A to the hammer drill 1A, one of the hammer drill 1A and the dust collection device 40A is slid in the front-rear direction with the guide rails 110, 110 of the casing 41 positioned on the front side of the guide grooves 108, 108 of the hammer drill 1A such that the guide grooves 108, 108 are fitted between the guide rails 110, 110. Then, the guide rails 110, 110 are fitted and coupled to the guide grooves 108, 108, and the distal end of the hook 111 is engaged with the engagement recessed portion 109, which completes mounting. At this time, the upper tube 117 of the casing 41 tightly contacts the connection port 96 of the intermediate housing 91 so that the suction path 119 communicates with the air suction chamber 98. When the dust collection device 40A is mounted, the front surface of the casing 41 is positioned on the rear side with respect to the chuck member 37a which is provided inside the operation sleeve 37.

When the switch 10 is turned on by pushing in the switch lever 11 of the hammer drill 1A with the distal end of the bit body 71 of the dust suction bit 70, which is mounted to the tool holder 23, pressed against a surface to be processed of a workpiece, the motor 5 is driven to rotate the output shaft 6, which rotates the intermediate shaft 100. At this time, by selecting one of a switch position for engagement with only the first gear 101, a switch position for engagement with only the boss sleeve 103, and a switch position for engagement with the first gear 101 and the boss sleeve 103 at the same time by sliding the clutches 102, 102 by operating the changeover knob 29 (not illustrated in FIG. 4) which is provided on the side surface of the front housing 90, it is possible to select one of a drill mode in which the tool holder 23 is rotated via the second gear 107 to rotate the bit body 71, a hammer mode in which the piston cylinder 104 is reciprocally moved by swinging motion of the arm 106 to strike the bit body 71 via the impact bolt 36 using the striker 35 which is moved in conjunction with the piston cylinder 104, and a hammer drill mode in which rotation of the tool holder 23 and striking of the impact bolt 36 are performed concurrently.

The dust collection fan 94 is rotated together with the motor cooling fan 82 by rotation of the output shaft 6, and therefore a negative pressure is caused in the dust collection path R, which communicates with the air suction chamber 98, to generate a sucking force in the flexible hose 81. Hence, outside air is sucked from the suction ports 77 via the hose attachment portion 72 and the dust suction path 76. The sucked outside air passes through the dust suction path 76 and the hose attachment portion 72, enters the casing 41 from the introduction port 66 via the flexible hose 81, passes through the elbow 115, and enters the dust box 43 from the inlet port 130. After that, the air passes through the filter 65 to reach the air suction chamber 98 from the outlet port 131 via the suction path 119, and is discharged from the exhaust port to the outside. Thus, powder dust generated from the workpiece is suctioned into the suction ports 77, enters the dust box 43 via the hose attachment portion 72, the flexible hose 81, and the elbow 115, and is captured by the filter 65 when passing through the filter 65 to be stored in the box body 124.

A rotational bias force in the rotational direction of the bit body 71 is applied to the hose attachment portion 72 by a friction force generated between the bit body 71 and the exterior portion 79 of the hose attachment portion 72 along with rotation of the bit body 71. Since the flexible hose 81 is connected between the tubular portion 80 and the introduction port 66, however, rotation of the hose attachment portion 72 is suppressed. The rotation suppression effect can be provided by the flexible hose 81 even if powder dust or the like enters a slide portion of the exterior portion 79 to degrade slidability.

When removing the dust collection device 40A, on the other hand, one of the hammer drill 1A and the dust collection device 40A is slid in the direction away from the other, conversely to when mounting, with the operation button 113 pushed in to disengage the hook 111 from the engagement recessed portion 109. Then, the guide rails 110, 110 are disengaged from the guide grooves 108, 108, which completes removal.

To discard the powder dust which is stored in the dust box 43, the operation piece 128 is pushed rearward to be disengaged from the engagement projecting portion 121, and the front side of the dust box 43 is pulled downward about the receiving shaft 123. Then, the dust box 43 can be detached from the coupling portion 42.

Next, by removing the lid engagement piece 129 of the lid body 126 from the box body 124 to open the lid body 126, the powder dust can be discarded from the opening of the box body 124.

As described above, the dust suction bit dust collection system S and the hammer drill 1A according to the embodiment described above include the dust suction bit 70 mounted to the hammer drill 1A and obtained by externally mounting the suction head (hose attachment portion 72) for dust suction on the bit body 71. The dust suction bit dust collection system S and the hammer drill 1A also include the dust collection device 40A mounted to the hammer drill 1A and including the introduction port 66 which generates a sucking force and the dust collection portion (dust box 43) that stores powder dust suctioned from the introduction port 66. Further, the dust suction bit dust collection system S and the hammer drill 1A include the flexible hose 81 connected between the hose attachment portion 72 and the introduction port 66. Thus, durability can be improved by preventing breakage of the hose attachment portion 72, even if the slidability between the bit body 71 and the hose attachment portion 72 is degraded.

In particular, the dust collection device 40A has the suction path 119 which communicates with the air suction chamber 98 which is provided in the hammer drill 1A when the dust collection device 40A is mounted to the hammer drill 1A, and obtains a sucking force from the hammer drill 1A. Thus, the configuration of the dust collection device 40A can be simplified to suppress a cost increase. This also leads to a reduction in the weight of the system.

The introduction port 66 is provided in the front surface of the dust collection device 40A. Thus, the flexible hose 81 can be connected easily, and the length of the flexible hose 81 can be shortened, which is less likely to obstruct work.

The front surface of the dust collection device 40A is positioned on the rear side with respect to the chuck member 37*a* when the dust collection device 40A is mounted to the hammer drill 1A. Thus, an operation to mount and unmount the dust suction bit 70 using the operation sleeve 37 is not obstructed even if the dust collection device 40A is mounted.

In the embodiment described above, the introduction port of the dust collection device is not limited to being formed on the upper side of the front surface of the casing, and may be provided on the lower side of the front surface of the casing. Alternatively, the introduction port may be formed in a side surface or the upper surface, rather than the front surface, of the casing. The structure for mounting to the hammer drill is changeable as appropriate.

In common to the dust suction bit dust collection systems and the hammer drills according to the various embodiments of the present invention, the present invention is applicable to the dust suction bit with various structures, such as dust suction bits with a short bit body or a hose attachment portion positioned or shaped differently.

As has been described above, the following inventions can be extracted from the dust suction bit dust collection systems and the hammer drills according to the embodiments described above, in order to improve durability by preventing breakage of the suction head of the dust suction bit, even if the slidability between the bit body of the dust suction bit and the suction head is degraded.

(1) An invention of a dust suction bit dust collection system including a dust suction bit mounted to an electric power tool and obtained by externally mounting a suction head for dust suction on a bit body a dust collection device mounted to the electric power tool and including an introduction port that generates a sucking force and a dust collection portion that stores powder dust suctioned from the introduction port, and a flexible hose connected between the suction head and the introduction port.

(2) The invention according to the configuration in (1), in which the dust collection device includes a dust collection motor and a dust collection fan for generating a sucking force.

(3) The invention according to the configuration in (1), in which the dust collection device has a suction path that communicates with an air suction chamber provided in the electric power tool when the dust collection device is mounted to the electric power tool, and obtains a sucking force from the electric power tool.

(4) The invention according to the configuration in any one of (1) to (3), in which the introduction port is provided in the front surface of the dust collection device.

(5) The invention according to the configuration in (4), in which a chuck member that allows the dust suction bit to be mounted and unmounted by operating an operation member is provided at the front portion of the electric power tool, and the front surface of the dust collection device is positioned on the rear side with respect to the chuck member when the dust collection device is mounted to the electric power tool.

(6) The invention according to the configuration in any one of (1) to (5), in which the electric power tool has a housing that houses an output portion, and an anti-vibration housing coupled so as to be movable relative to the housing via anti-vibration portions, and the dust collection device is mounted to the anti-vibration housing.

(7) The invention according to the configuration in (2), in which the dust collection device has an exhaust flow path that can supply exhaust generated by the dust collection fan to an output portion of the electric power tool when the dust collection device is mounted to the electric power tool.

(8) An invention of a hammer drill including the dust suction bit dust collection system according to any one of (1) to (7).

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. An electric power tool dust collection system comprising:
    a hammer drill (1) that includes a hammer drill motor and a hammer drill fan, (2) configured to receive and retain a bit and (3) that includes an output portion with a striking mechanism;
    a dust collection device mounted to the hammer drill and including a suction portion, a dust collection motor, a dust collection fan rotated by drive of the dust collection motor to generate a sucking force in the suction portion, and a dust collection portion that stores powder dust suctioned from the suction portion; and
    a first exhaust flow path in the hammer drill and a second exhaust flow path in the dust collection device configured to lead exhaust air that has passed through the dust collection portion to the output portion in an interior of the hammer drill to cool the output portion;
    wherein:
    the dust collection motor is a separate motor from the hammer drill motor and the dust collection fan is a separate fan from the hammer drill fan;
    the output portion is tubular and extends along a longitudinal axis of the bit when the bit is retained by the hammer drill; and
    the output portion and the first exhaust flow path are configured such that the exhaust air directly contacts the output portion in the first exhaust flow path.

2. The electric power tool dust collection system according to claim 1, wherein
    the exhaust flow paths communicate with each other when the dust collection device is mounted to the hammer drill.

3. The electric power tool dust collection system according to claim 1, wherein
    the first exhaust flow path is also used as a flow path for cooling air generated by rotation of the hammer drill fan.

4. The electric power tool dust collection system according to claim 1, wherein
    the hammer drill includes a motor housing portion that houses the hammer drill motor with an output shaft directed upward, and the dust collection device is mounted in front of the motor housing portion.

5. The electric power tool dust collection system according to claim 4, wherein
    the dust collection device is mounted under the motor housing portion.

6. The electric power tool dust collection system according to claim 1, wherein
    the hammer drill includes a housing that is divided into a housing on an anti-vibration side and a housing on a non-anti-vibration side via an anti-vibration portion, and the first exhaust flow path in the hammer drill is formed in a space between the housing on the anti-vibration side and the housing on the non-anti-vibration side.

7. The electric power tool dust collection system according to claim 6, wherein
the dust collection device is mounted to the housing on the anti-vibration side.

8. The electric power tool dust collection system according to claim 1, wherein
the first exhaust flow path is tubular with an axis parallel to an axis of the bit when the bit is retained by the hammer drill.

9. The electric power tool dust collection system according to claim 8, wherein
the first exhaust flow path is formed between an inner housing, which holds a tool holder into which the bit is inserted, and an outside housing, which covers an outside of the inner housing.

10. The electric power tool dust collection system according to claim 9, wherein
the dust collection device is slid upward from a lower side of the hammer drill to be mounted.

11. The electric power tool dust collection system according to claim 10, wherein:
the second exhaust flow path is formed to project upward from a casing of the dust collection device; and
an exhaust introduction port, which communicates with the first exhaust flow path and into which the second exhaust flow path is inserted when the dust collection device is mounted, is formed in a lower surface of the outside housing.

12. The electric power tool dust collection system according to claim 1, wherein
the dust collection portion is a dust box removably mounted to the dust collection device.

13. The electric power tool dust collection system according to claim 1, wherein the exhaust air passes circumferentially around the output portion.

14. The electric power tool dust collection system according to claim 9, wherein the exhaust air directly contacts the inner housing.

* * * * *